United States Patent [19]

Grochal

[11] Patent Number: 5,536,566
[45] Date of Patent: Jul. 16, 1996

[54] LAMINATED THERMAL INSULATOR SYSTEM

[75] Inventor: Peter Grochal, Waldshut-Tiengen, Germany

[73] Assignee: STO Aktiengesellschaft, Stuhlingen, Germany

[21] Appl. No.: 214,257

[22] Filed: Mar. 17, 1994

[30] Foreign Application Priority Data

Mar. 17, 1993 [EP] European Pat. Off. .............. 93104342

[51] Int. Cl.$^6$ .................................. E04F 13/02; F24J 2/40
[52] U.S. Cl. ........................... 428/323; 52/306; 52/404.1;
428/324; 428/325; 428/327; 428/328; 428/329;
428/331; 428/332; 428/411.1
[58] Field of Search .................................... 428/332, 323,
428/325, 411.1, 324, 327, 328, 329, 331;
52/306, 404.1

[56] References Cited

U.S. PATENT DOCUMENTS

| | | | |
|---|---|---|---|
| 2,710,274 | 6/1955 | Kuehl | 154/277 |
| 3,384,324 | 5/1968 | O'Sullivan, Jr. | 244/1 |
| 4,259,401 | 3/1981 | Chahroudi et al. | 428/306 |
| 4,505,953 | 3/1985 | Chen et al. | 427/212 |
| 4,581,285 | 4/1986 | Mahefkey, Jr. | 428/285 |
| 5,016,412 | 5/1991 | Grochal | 52/302 |

FOREIGN PATENT DOCUMENTS

| | | |
|---|---|---|
| 0333145 | 9/1989 | European Pat. Off. . |
| 2738253 | 8/1977 | Germany . |
| 3213092 | 10/1982 | Germany . |
| 3522078 | 1/1987 | Germany . |
| 2142135 | 1/1985 | United Kingdom . |

*Primary Examiner*—D. S. Nakarani
*Attorney, Agent, or Firm*—Jacobson, Price, Holman & Stern

[57] ABSTRACT

The laminated thermal insulator system to be affixed to a building wall is comprised of a laminated thermal insulator system for affixing to a building wall, comprised of a light-absorbing wall outer surface, an at least partially light-permeable insulating material, and on the exterior (possibly with the interposition of a light-permeable protective layer) a weather-resistant, at least partially light-permeable layer of a plaster-type coating with a coating thickness of 0.5–6 mm, comprised of a curable, hardenable binder containing a filler, wherein the filler is present in an amount such that the transmissivity of the said coating is greater than 20% for perpendicularly incident light radiation. To avoid overheating, at least one layer comprising a plurality of embedded hollow bodies and/or hollow microbodies is applied to the insulator material, which microbodies provide transparent containers for a material, the light-permeability of which decreases reversibly when the temperature exceeds a predetermined temperature.

10 Claims, 2 Drawing Sheets

LAMINATED THERMAL INSULATOR SYSTEM

The invention relates to a laminated thermal insulator system for affixing to a building wall, comprised of a light-absorbing wall outer surface, an at least partially light-permeable insulating material, and on the exterior (possibly with the interposition of a light-permeable protective layer), a weather-resistant, at least partially light-permeable layer of a plaster-type coating having a coating thickness of 0.5–6 mm, comprised of a curable, hardenable binder containing a filler, wherein the filler is present in an amount such that the transmissivity of the said coating is greater than 20% for perpendicularly incident light radiation.

BACKGROUND OF THE INVENTION

In a known laminated insulator of this type (EP-0 333 145), it is deemed undesirable that under conditions of intense light irradiation and simultaneous high exterior temperatures, e.g., as encountered in the summer, the proportion of incident light energy converted to heat within the system and up to the building wall is high, and that accordingly, the temperature in the interior of the building is increased.

It is known (DE-A-35 22 078) to employ a liquid material to control light permeability as a function of temperature, rendered practicable by enclosing the liquid in a transparent enclosure. The material reversibly changes its light permeability with temperature. The transparent body serving as an enclosure element (or elements) for the liquid may be, e.g., a laminated plate, or a plastic sandwich sheet or plate. Automatic light-attenuation means are provided thereby. The outer dimensions of the said enclosure element determine the size of the unit, i.e., the thickness of the flat body which results. The problem of the shading of glass surfaces can be solved with the use of such bodies, i.e., an effective, maximally automatically operating shading means is produced which enables utilization of the heating capability of sunlight in the winter but prevents excessive heating from sunlight in the summer. Further, one can dispense with the otherwise commonly used but costly window shades employed to control light penetration.

A disadvantage of the known solutions from the standpoint of building technology has turned out to be that the bodies produced from the conventional units are bulky and unwieldy. Thus, construction with such pre-manufactured transparent bodies is difficult and expensive to perform, because precise architectural planning is required in order to install the bodies in precise positions relative to each other and the other structural features of the building under construction. Moreover, the plates with their smooth outer surfaces lend a distinct appearance to the finished building which is generally unattractive. In addition, there is the functional drawback that light passes through the plates and is absorbed at some distance from them. Consequently, the plates allow infrared (IR) radiation to pass, which have high heating properties, and in particular it passes until the regions behind the plates are overheated before the heat conducts back to the plates and brings about the needed reduction of the transparency of the plates.

OBJECTS OF THE INVENTION

It is a primary object of the present invention to provide an improved laminated thermal insulator system for affixing to a building wall having effective absorption for light radiation, particularly IR radiation.

Another object of the present invention is to provide a laminated thermal insulator system comprising at least a weather resistant plaster type coating comprising a curable binder containing a partially light permeable filler in an amount such that the transmissivity of the coating is greater than 20% for perpendicularly incident light radiation for a layer thickness of 0.5–6 mm.

A further object of the present invention is to provide a laminated thermal insulator system which is manageable and controls the amount of transmitted light and of the interior building temperature efficiently at a relatively low cost.

Still another object of the invention is to provide a method for controlling the light permeability of a building wall when the temperature of the building wall rapidly rises excessively upon exposure to incoming light.

SUMMARY OF THE INVENTION

In accordance with the present invention, it has been found that the described disadvantages of a laminated insulator in the prior art can be eliminated if at least one layer comprising a plurality of embedded hollow bodies and/or hollow microbodies is applied to the insulator material. These hollow bodies and/or-microbodies provide transparent containers for a material, the light-permeability of which decreases reversibly when the temperature exceeds a predetermined temperature. The said at least one layer may consist of an added layer disposed between the insulation material and the outer, plaster-type coating layer. It has been found to be particularly advantageous if the layer bearing the hollow bodies and/or microbodies containing the light controlling material is the plaster-type coating layer itself. In this case, the hollow bodies and/or microbodies containing the effective material are employed as filler bodies which are mixed into the plaster-type coating as so-called extender material, and the plaster-type coating is applied directly to the building wall or to a layer of light-permeable insulator material applied to the building wall. The light-controlling properties of the hollow bodies and/or microbodies can be fully utilized in this composition without detriment to the other properties of the plaster-type coating.

The shape of the hollow bodies is preferably spherical. However, they may have a shape which deviates from spherical, e.g., oblong or oval.

The hollow bodies and/or microbodies which enclose the active material and are incorporated into the additional layer and/or the plaster-type coating layer may be comprised of a plastic material which has particularly effective absorption for light radiation, and preferably infrared (IR) radiation. Because of its absorptivity, such plastic material undergoes particularly rapid temperature increase directly upon exposure to the incoming light, and this temperature increase leads rapidly to the desired decrease in transparency, i.e., light permeability. It has been found particularly advantageous, however, to manufacture the hollow bodies of glass, because of the high abrasive wear resistance of glass in comparison to most candidate plastics, which is of benefit when employing agitating elements ordinarily used in mixing plaster-type coating compositions, to mix the glass hollow bodies into the other coating components. Plastic hollow bodies simply cannot withstand the stresses imposed by agitating elements, particularly is the case of bodies of very small size in the form of microcapsules such as have been used for decades for encapsulating chemical substances, e.g., ink-like liquids in carbonless carbon papers. Thus, glass is substantially more durable. Another important advantage of glass for enclosures for the light-permeability controlling material is that the fire characteristics of the plaster-type coating are much better, in that glass is unburnable ("neutral with respect to fire"), wherein in the event of liberation of the enclosed material, e.g., by failure of the glass, said material would then contribute to extinguishing the fire. Accordingly, a plaster-type coating containing the inventive light-permeability-controlling hollow bodies is particularly well suited for the outer coating of a fire-resistant transparent insulator panel.

A wide variety of substances may serve as the active material. Numerous examples of bodies with reversible temperature-dependent transparency are found in DE-A-27 38 253 and 32 13 092 (U.S. Pat. No. 4,421,560) and are incorporated herein by reference. The substances disclosed in DE-A-35 22 078 have the advantage that the transition temperature can be adjusted easily over an appreciable range by changing the proportions of components and are incorporated herein by reference. In this regard, the composition of materials used for controlling light-permeability comprises, e.g.:

2.5–40 wt. % of a polyether compound with epoxide groups ("ethylene oxide groups");

0–25 wt. % of a crosslinking agent containing 5–10 epoxide groups in its molecule;

2.5–22.5 wt. % of a solvent which is miscible with water;

0.1–2 wt. % of a carboxyvinyl polymer, 0.05–2 wt. % of a base;

50–60 wt. % water; and possibly up to 2 wt. % of customary additives.

In the manufacture of laminated insulators according to the invention, the hollow bodies and/or microbodies providing control of light-permeability may be mixed into a plaster-like mass as so-called extenders, without danger of detriment to the usual freedom of engineering design, i.e., the architectural properties. If the hollow bodies and/or microbodies are so large that they are suited for a relatively coarse-grained plaster-type coating, this is actually an advantage, because their incorporation into the coating material improves the structure of the material, which like the architectural properties depends on the geometry. The plaster-type material may be processed and worked with in the same manner as plaster-like materials with ordinary extenders. The incorporation of extenders of this type having an adjustable transmissivity into the customary fillers of a weather-resistant coating layer having a plaster-like nature which may be applied to, e.g., a building wall, ensures that the hollow bodies and/or microbodies of these panel units having reversible transparency, i.e., light-permeability, very quickly enter into control of the transparency, i.e., light-permeability. The hollow bodies thereby ultimately control the amount of transmitted light and of the interior building temperature, because they are directly heated at the location of said coating layer. The plaster-type material is bonded to the substrate by means of suitable, more or less transparent cementing agents, preferably plastic resins, in the form of a dispersion or solution of said resins. In this connection, the plaster-type material may comprise interior binders comprised of polyacrylates, polymethacrylates, copolymers of poly(meth) acrylates, styrene copolymers, ethylene copolymers, vinyl acetate copolymers., fluoroethylene copolymers, silicone resins, polycarbonates, epoxy resins, and/or polyurethanes. Inorganic binders, e.g., water glass, are particularly good candidates as interior binders for the water-resistant plaster-type coating material containing the extender with reversible transparency, i.e., light-permeability.

Upon further study of the specification and appended claims, further objectives and advantages of the invention will become apparent to those skilled in the art.

BRIEF DESCRIPTION OF THE DRAWINGS

A better understanding of the present invention, as well as the objects, features and advantages thereof will become apparent upon consideration of the detailed description thereof, when considered in connection with the accompanying drawings thereof wherein.

Figure 1:
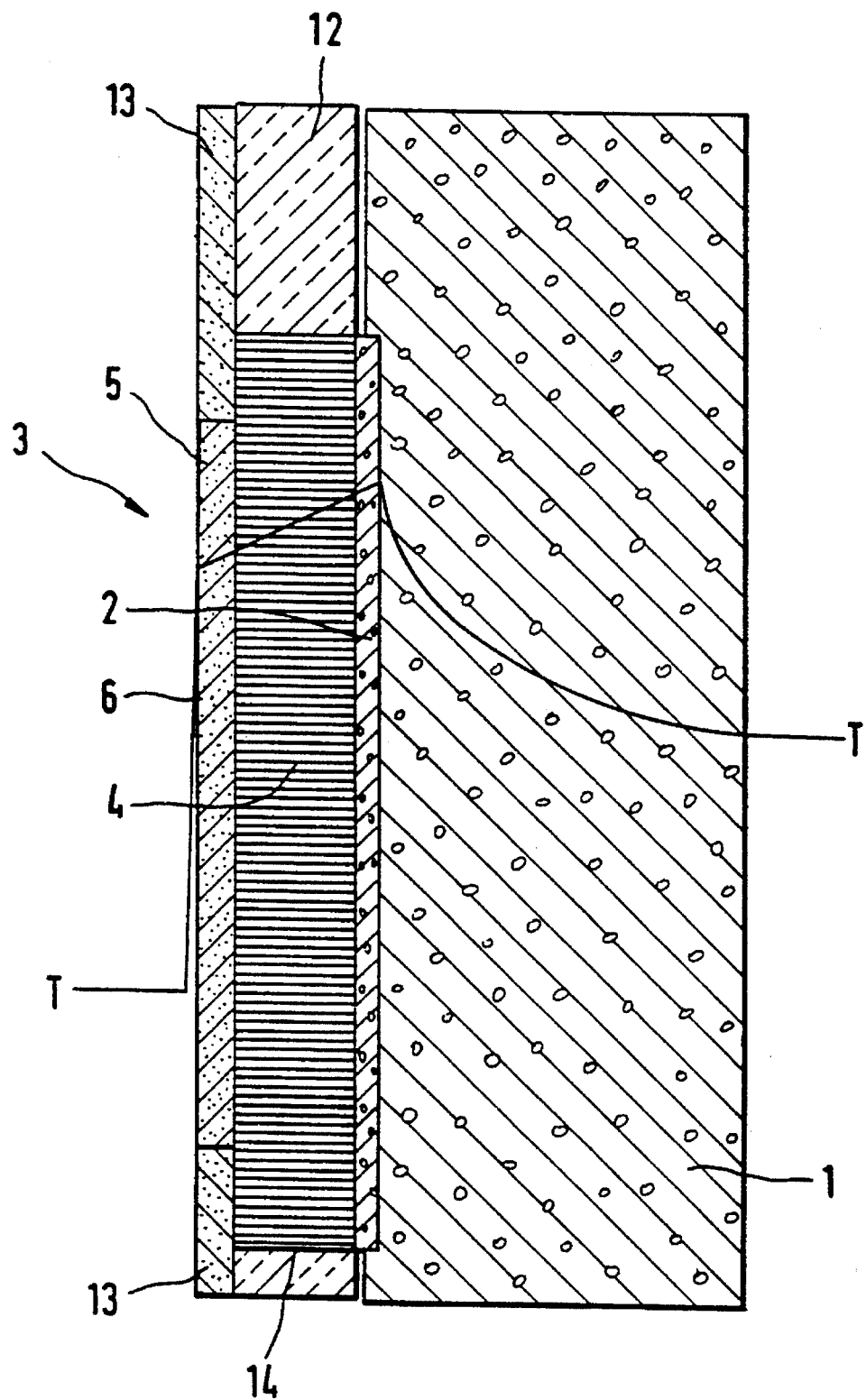
FIG. 1 is a schematic cross sectional view of the laminated thermal insulator, for illustrating the characteristic temperature profile.

A laminated insulator 3 (FIG. 1) is affixed to a building wall 1 with a light-absorbing outer wall surface 2, which insulator comprises an at least partially light-permeable insulator material 4 which is protected against weathering on its exterior side. For the purpose of such weather protection, the insulator material 4 is provided with a weather-resistant layer 5 of a plaster-type coating comprised of a curable binder containing an at least partially light-permeable filler in an amount such that the transmissivity to sunlight radiation impinging perpendicularly is over 20% for layer thicknesses of 0.5–6 mm. A light-permeable protective layer 6 is disposed between the light-permeable plaster-type coating 5 and the insulator material 4. Layer 6 is comprised of a layer of light-permeable mastic or the like with embedded glass fiber (woven fabric) or plastic woven fabric. The insulator material 4 may be affixed to the exterior surface 2 of wall 1 by means of a layer of adhesive. Such an adhesive bond is particularly easy to produce if the insulator material 4 is in the form of insulator plates. Advantageously, the insulator plates are in the form of capillary plates, i.e., comprised of a plurality of adjoining plastic tubes bound mutually together, which tubes have inner diameter 1–3.5 mm, preferably 2.5 mm, and are disposed perpendicularly to the plane of the plate, i.e., in the direction of through-passage of the light. These tubes are bound together by means of, e.g., a hot wire used to shear them to length, wherein the binding takes place during the course of the hot shearing, namely in the region of the tube ends disposed in the planes of the outer surfaces of the plate. If the layer 5 of plaster-type coating is applied immediately prior to the application of the protective layer 6, the material 5 and/or 6 penetrates a slight amount, i.e., a short distance into the capillary openings, and when it becomes set, it contributes to the binding together of the tube ends. An adhesive is used for direct bonding of the insulator plates to the building wall 1; the adhesive layer can then simultaneously form the light-absorbing wall outer surface 2.

It may also be seen from FIG. 1 that the light-permeable insulator material 4 immediately adjoins an opaque polystyrene insulator material 12 which is affixed to the building wall 1, wherein the laminated insulator is comprised of an at least partially light-permeable region and a light-impermeable region. The opaque insulator material 12 and the light-permeable insulator material 4 are both affixed to the building wall 1. To ensure a gapless connection between the opaque insulator material 12 and the light-permeable insulator material 4, the protective layer 13 which covers the opaque plates is applied over the butt joint 14 between the opaque and light-permeable insulator plates and appreciably therebeyond into the border region of the light-permeable insulator plates 4. This protective layer 13 is immediately and snugly adjoined by the light-permeable protective layer 6 which covers the light-permeable insulator plates 4. It is possible to use the same weather-resistant layer of plaster-type coating 5 to cover both the opaque insulator material 12 and the light-permeable insulator material 4, wherein said coating 5 may optionally be applied over the protective layer 6.

The plaster-type coating 5 material may be comprised to a substantial degree of an acrylate dispersion, along with solvents, defoamants, thickeners, and preservatives. According to the invention, the hollow bodies and/or microbodies which have included light-permeability regulating materials are embedded in the plaster-type coating material with these interior binder components.

As may further be seen from FIG. 1, the special plaster-coating layer 5 serves to bring about warming from the incident light before said light reaches the wall outer surface 2. This is indicated in the temperature profile T-T shown in FIG. 1. The rapid rise in temperature is accompanied by an early reduction of the light-permeability as a result of the hollow bodies embedded in the plaster-type coating, the corresponding rapid and excessive temperature rise is prevented in the region of the wall outer surface 2. As indicated by the T-curve, the temperature rise between the layer 5 and the wall outer surface 2 is relatively small. The temperature T then falls off appreciably between the outer surface 2 and the inner surface of the wall.

Figure 2:
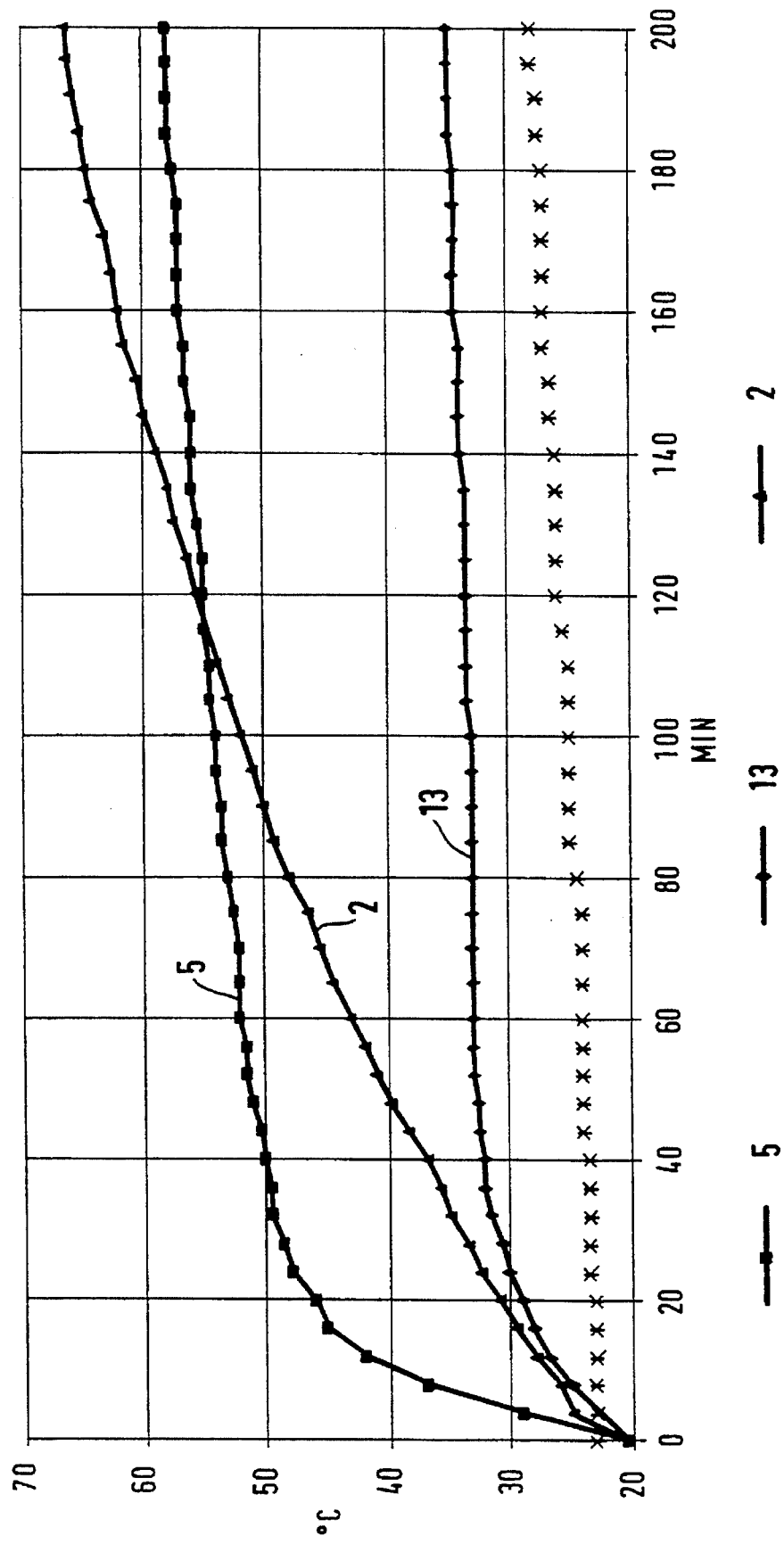
FIG. 2 is a diagram for illustrating the timewise variation of temperature in various regions of the insulator according to FIG. 1.

FIG. 2 shows the typical plot of temperature versus time for the laminated insulator of FIG. 1, for incident light intensity ca. 800 W/sq. m., and ambient outside air at room temperature. It is seen that, surprisingly, the transparent, i.e., light-permeable plaster-type coating heats up rapidly (curve 5), whereas the absorptive layer on the outer surface 2 of the building wall 1 heats up slowly (curve 2). The time at which curve 2 intersects curve 5 depends on the structure of the wall 1. A wall comprised of a structural material with good thermal conductivity heats up more slowly than a wall comprised of a material with lower thermal conductivity. In the case illustrated, the intersection is at ca. 111 min, i.e., it takes 111 min for the outer surface of the wall to reach the same temperature as the plaster-type coating layer. FIG. 2 also indicates that the temperature reached by the opaque plaster-type coating layer 13 is relatively low, and remains constant over a relatively long time (curve 13).

It is seen from FIG. 2 that the layers comprising the plaster-type coating and the protective layer heat up (and cool down) substantially more rapidly than the outer surface of the building wall. The inventive laminated insulator system is thus particularly well suited for the automatic regulation task.

The temperature at which the light permeability change, i.e., the turbidity, occurs is selected according to the respective country, i.e., the respective parallel of latitude, between 30° and 50° C. In countries having a high average temperature, the turbidity has to occur earlier, i.e., 30° C.

In the following, the production of plaster of temperature-dependent light permeability will be described by way of an example, wherein the turbidity occurs at preferably 30° C.

As the binder for the weather-proof plaster-type coating material containing the extenders of reversible transparency, water glass is preferably used. The production of the extenders is effected, as disclosed in German Patent Application No. 41 36 521, by placing hollow glass bodies of spherical or oval shape which have a small, preferably capillary opening in a hollow space. The hollow space is then evacuated and the material serving for the temperature-dependent light permeability control is introduced in said evacuated hollow space containing the hollow glass bodies. When removing the vacuum until the rise of pressure has reached the normal pressure level, the material penetrates into the hollow bodies under the action of the pressure. The subsequent closing and sealing of the openings in the hollow bodies is effected, for example, by means of materials based on water glass.

Another possibility of creating very small hollow bodies having material contained therein for the purpose of light permeability control forms the subject matter of German Patent Application No. 41 36 521. In this prior art, glass tubes having a very fine opening, preferably a capillary opening, are used which are filled with the material and subsequently are locally heated for a short time at short intervals and subdivided to create local sealings. The local heating is preferably effected by means of laser beams.

As the material of reversible transparency at a switching temperature of 30° C., a gel composed of 75.0% by weight of gel basis 15.0% by weight of thermotropic polyether compound of medium viscosity (n=35)

10.0% by weight of Diglycol is used.

The gel basis contains:

98.8% by weight of water 0.8% by weight of vinylcarboxypolymer (e.g., Carbopol 934)

0.2% by weight of a tenside having 6 ethylene oxide groups (e.g., Lutensol AP6)

0.2% by weight of triethylamine.

PRODUCTION OF GEL BASIS

Carbopol 934 is slowly added to the water and mixed in thoroughly. After mixing with Lutensol AP6, the mixture is thickened by the basic component. The gel basis will be usable for setting the turbidity temperature after the temperature-dependent gelatinization which takes 2 to 12 hours.

The composition of a thermotropic material such as described e.g., initially above is known from German Patent Application No. 35 22 078.

While this invention has been disclosed and described with respect to preferred embodiments, it will be understood by those skilled in the art that various changes and modifications may be made without departing from the spirit and scope of the invention as set forth in the following claims.

I claim:

1. A laminated thermal insulator system for affixing to a building wall comprising:

(a) a light-absorbing adhesive layer attached to a building wall;

(b) a partially light-permeable insulating material adjacent to said surface; and (c) a weather resistant, partially light-permeable coating applied to the outermost surface of the insulating material having a thickness of 0.5–6 mm; the coating comprising a curable, hardenable binder containing a filler, wherein the filler is present in an amount such that the transmissivity of the coating is greater than 20% for perpendicularly incident light radiation;

wherein at least one layer adjacent to the insulating material contains a plurality of embedded hollow bodies, wherein the hollow bodies provide transparent containers for a material, the light-permeability of said material inside the hollow bodies decreases reversibly when the temperature exceeds a temperature characteristic of said material; the temperature at which light permeability changes is between 30° C. and 50° C.

2. The laminated thermal insulator system according to claim 1 wherein the layer comprising the hollow bodies is the coating layer.

3. The laminated thermal insulator system according to claim 1 wherein the hollow bodies have a spherical, oblong, or oval shape.

4. The laminated thermal insulator system according to claim 1 wherein the hollow bodies are comprised of glass.

5. The laminated thermal insulator system according to claim 1 further comprising a light-permeable protective layer which is disposed between the light-permeable coating and light-permeable insulating material.

6. The laminated thermal insulator system according to claim 5 wherein the light-permeable protective layer comprises a layer of light permeable mastic with embedded glass fiber.

7. The laminated thermal insulator system according to claim 1 wherein the binder is selected from the group consisting of polyacrylates, polymethacrylates, copolymers of poly(meth) acrylates, styrene copolymers, ethylene copolymers, vinyl acetate copolymers, fluoroethylene copolymers, silicone resins, polycarbonates, epoxy resins, polyurethanes and water glass.

8. The laminated thermal insulator system according to claim 7 wherein the binder is water glass.

9. The laminated thermal insulator system according to claim wherein the light-absorbing adhesive layer is attached to the partially light-permeable insulating material.

10. The laminated thermal insulator system according to claim 1 wherein the partially light-permeable insulating material is present in an amount such that the transmissivity of the layer is greater than 20% for perpendicularly incident light radiation.

* * * * *